Jan. 10, 1939.  W. A. RAY  2,143,210
LIMIT CONTROL
Filed Sept. 9, 1935
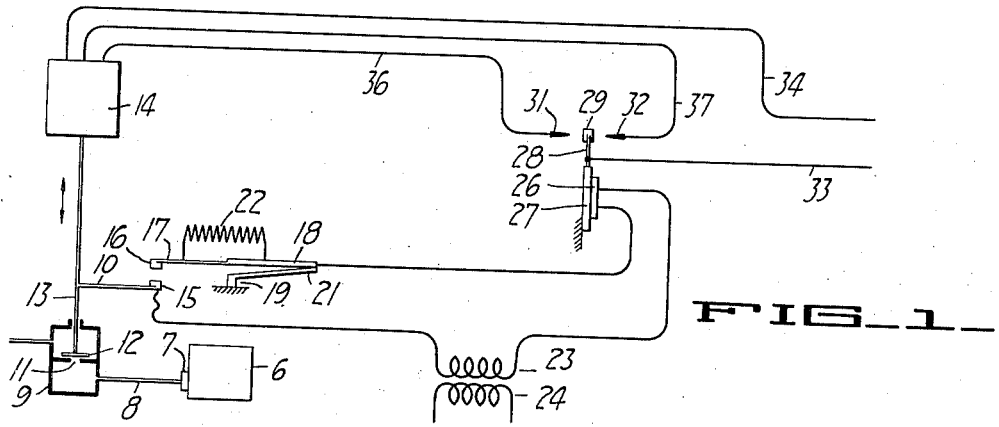
FIG_1_
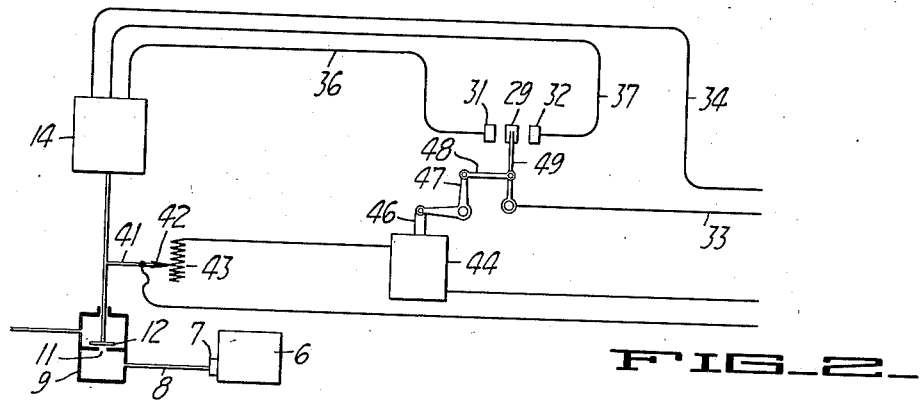
FIG_2_
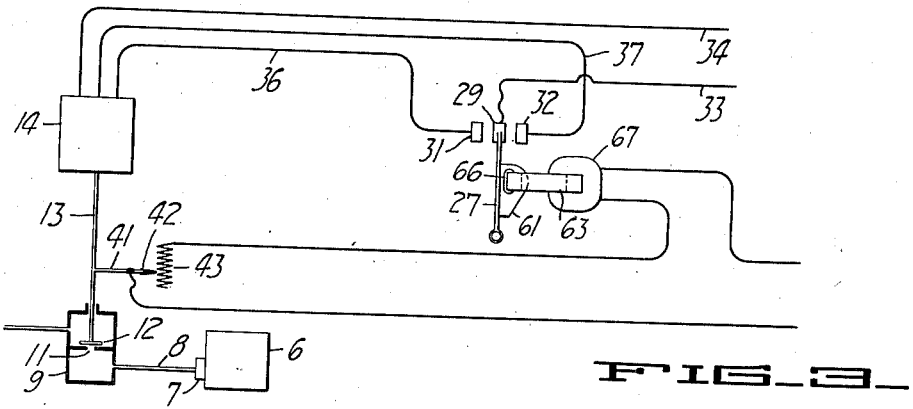
FIG_3_
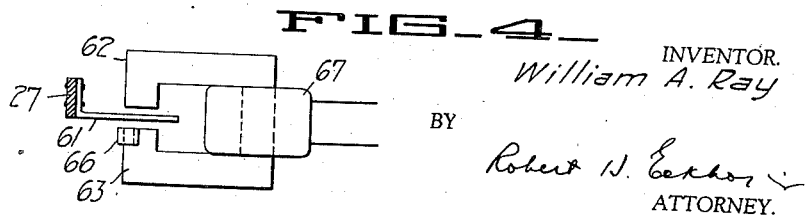
FIG_4_
INVENTOR.
William A. Ray
BY
Robert N. Eckhart
ATTORNEY.

Patented Jan. 10, 1939

2,143,210

UNITED STATES PATENT OFFICE 2,143,210

LIMIT CONTROL

William A. Ray, San Francisco, Calif., assignor to General Controls Company, a corporation of California Application September 9, 1935, Serial No. 39,728

5 Claims. (Cl. 236—68)

This invention relates to a limit control device, particularly one adapted to the control of a domestic heating furnace and the like.

In the operation of a domestic heating furnace, for example, it is desirable that the control device be capable of procuring a throttling action upon such means as the heat supply means. Thus, if a room thermostat calls for a temperature of 70° F. and the temperature in the room is actually 50° F. there is no objection whatsoever to the heat supply means for the furnace operating at full capacity. However, if the temperature in the room is 67°, full capacity operation of the heat supply means will result in inefficient operation and an overrunning of the temperature of 70°. Theoretically the most desirable operation condition would be that in which the heat supply means operated in proportion to the differential existing between the desired temperature and the actual temperature. Such operation requires a fluttering action, a throttling down of the amount of heat supply as the differential decreases so that the heat supply rate diminishes in proportion as the differential between the actual and the desired temperature. In accordance with the present invention this manner of operation is attained by creating a false thermostat temperature and by utilizing this false temperature to control operation of the heat supply means. In actual practice the invention can be considered as comprising two units, a control unit for the fuel supply and a limit control device operating upon the temperature of the room. The first unit, for example, can include a valve controlling the source of heat supply. This can be steam, or a fuel supply to a burner. The valve is adapted to be opened and closed for example by a reversible motor operating through a gear train. The rate of opening or closing movement of the valve is usually quite slow and a goodly time interval, such as ten minutes, is contemplated within which the motor will run to move the valve to either its full open or full closed position from a full closed or a full open position. Operation of the motor is under control of the room thermostat. Now if this thermostat is in a room at a temperature of say 50° F. and is set to maintain a temperature of 70° F. it will close the circuit to the motor and opening movement of the heat supply valve will start. At the same time, in accordance with this invention, the thermostat is heated by a heat supply means directly associated with the thermostat. Since this heat supply means is provided to have a certain rate of heating, and since a considerable differential exists between the actual room temperature and that which is desired, some time will elapse before the thermostat attains that temperature at which it will shut off operation of the motor opening the heat supply valve. During this time the heat supply valve will be opening. When the thermostat finally attains that temperature, due to artificial heating thereof, at which it shuts off the motor, the heat supply valve will be very close to its full open position and the heat supply will be at the maximum rate. When the thermostat does cut off, opening movement of the heat supply valve, the valve remains open. However, the heating of the thermostat is under control of another device which is associated with the opening of the heat supply valve. In one instance, to be hereinafter set forth, a strip of bimetal is likewise heated and is included in a unit controlling the heating of the thermostat. This strip of bimetal being likewise heated, results in a breaking of the circuit to the heater on the thermostat.

When the room temperature begins to raise, the thermostat of course due to its artificial temperature loading from the associated heating means reverses operation of the motor and starts a slow closing movement of the fuel supply valve. However, the aforementioned bimetal strip is effective to open the heating circuit of the thermostat and the thermostat therefore is not heated continuously with the result that it works back and forth. In actual operation, the false temperature loading decreases as the temperature of the room rises and as it approaches the value for which the thermostat is set it decreases almost entirely until the thermostat finally shuts off.

The device that has been described makes possible the use of remote control of a heat supply means, for example, to the end that a throttling action can be secured on the heat supply means. In its simplest form, the limit control device described can be made to function at a considerable distance from the heat supply means with only four wires. The advantage of such a structure is obvious and it is therefore in general the broad object of the present device to provide an improved limit control device enabling control to be maintained and an operation to be secured which is in relation to the difference existing between the set of existing conditions and the set of desired conditions. The device is of course applicable to pressure control as well as temperature control and the previous discussion of the thermostat can be substituted for by a pressure responsive development to the end that a desired pressure can be maintained.

The invention includes other objects and features of advantage, some of which, together with the foregoing, will appear hereinafter wherein I have disclosed the preferred form of my invention.

In the drawing accompanying and forming a part hereof Figures 1, 2 and 3 are diagrammatic representations of apparatus and circuits for practicing the present invention while Figure 4 is a fragmentary plan view of a control device.

In accordance with this invention I provide means for controlling the operation of the device, in this instance a furnace 6 being chosen as illustrative. A burner 7 cooperates with and supplies heat to the furnace 6. Fuel 1 is supplied to the furnace 7 through line 8 and the flow thereof is through a valve 9, the heat supply control valve. This valve includes a valve seat 11 and a cooperative valve member 1 carried upon a valve stem 13. The valve stem is raised and lowered by a suitable motor 14. This motor can be either electrically or thermally operated and is adapted to move the valve stem positively in two directions so that the valve member 12 moves toward and away from the seat 11. Suitable electrical and thermal motors of this type are well known and need not be further discussed here except to say that I have chosen for purposes of illustration an electric motor in which the motor can be rotated in either direction to raise or lower the valve stem 13 slowly through a suitable gear train. The valve stem 13 includes an arm 10 carrying a contact 15. This contact cooperates with a contact 16 carried upon an insulated extension 17 of a bimetal strip 18. Bimetal strip 18 is supported from a fixed support 19 by a like bimetal strip 21. The two bimetal strips are so placed and connected that ambient temperature is compensated and need not be considered. The heating element 22 is connected to the contact 16 and to the bimetal strip 18 with which it is in good thermal contact so that, upon current passage through the heating element, heat is generated therein and the bimetal strip is in turn heated with the result that a flexing in a clockwise direction in Figure 1 occurs. Contacts 15 and 16 and the heating element 22 are included in a circuit with a secondary 23 of a step down transformer having a primary 24. Also included in this circuit is a heating element 26 carried upon a bimetal strip 27. An insulated strip 28 attached to the bimetal strip 27 carries a movable contact 29 which cooperates with fixed contacts 31 and 32 positioned on opposite sides of contact 29. A power source typified by lines 33 and 34 is connected respectively to the contact 29 and to the motor 14. Current passage to the motor from line 3 is through lines 36 and 37, these lines being respectively connected to different windings, for example, in the motor to secure a difference in the direction of the rotation thereof so that the valve stem 13 can be slowly raised or lowered positively. In operation, the bimetal strip 27 is subject to some temperature condition, for example that in a room. If the temperature drops too low the bimetal flexes in a clockwise direction in Figure 1 and contacts 32. Current then passes to the motor 14 and the valve stem 13 is slowly raised bringing the contact 15 into contact with the contact 16. This results in a current flow through the heating coils 22 and 26 so that bimetal strip 18 flexes in a clockwise direction, while bimetal strip 27 flexes in a counterclockwise direction as shown in Figure 1. Contacts 15 and 16 remain in engagement, however, due to continued movement of contact 15, while contact 29 is carried away from contact 32 breaking the circuit to the motor and leaving the valve in an open position. This does not at once discontinue the heating of the bimetal strip 27, however, and the bimetal strip 27 will continue to flex until it engages contact 31. This results in the motor moving valve stem 13 downwardly and, at the same time opening contacts 15 and 16 and discontinuing heating of both heating coils 22 and 26. Subsequently, the bimetal strip 18 will cool and, depending upon the relation of its temperature and the position of contact 15, it may or may not again engage the contacts 15 and 16 to cause fluid flow to the burner 7.

The actual operation of the structure disclosed, in relation of the bimetal strips 18 and 27 and their associated heating coils is such that the bimetal strip 27 operates under a false temperature loading. The purpose of this loading is to enable a fluttering action of the heat supply control means typified by the valve 9. It is to be remarked that the control effected over the heat supply control means is a remote one for direct mechanical connection need not be provided between the bimetal strip, or other control means, and the valve 9. As a matter of fact, the system can be operated with as few as four wires and these can extend for any desired distance so that the heat supply control means can be remotely located with respect to the thermostatic controlling its operation.

In operation, the bimetal strip 27 will secure a supply of heat at a rate in proportion to the necessity demand or, in other words, in proportion to the differential existing between a desired condition and the actual condition. For example, if a temperature of 70 F., is desired and a temperature of 50° F. exists, depending upon the setting of the particular apparatus, it is the function of the bimetal strip 27 to continue initially the full rate operation of the heat supply control means. Thus the heater 26 on the bimetal strip will have to supply a goodly quantity of heat, in view of the 20° differential existing before the bimetal strip will flex and carry contact 29 away from contact 32. During this time the motor has been slowly raising the valve stem 13 and the heat supply control is nearly wide open. When the contact 29 is separated from the contact 32 operation of the heat supply is not cut off but continues at the rate at which the valve determines. It is only upon continued heating that heater 22 carries contact 16 away from contact 15. This shuts off the heat to both heaters and bimetal strip 27 thereupon assumes its condition in relation to the temperature which exists in its locality. If this temperature is low it can contact 32 to result in a further opening of the heat supply control means.

The bimetal strip 18 is of course independent of the ambient temperature and it therefore will flutter on and off to supply heat to the heater 26 on bimetal strip 27. As the temperature differential decreases between the actual temperature and that desired, if temperature is utilized as the controlling condition, the false temperature load on the bimetal strip 27 will of course decrease as the differential decreases for engagement of contact 29 with contact 31 will result in the lowering of the valve stem 13 and a repositioning of contact 15. This requires that the bimetal strip 18 cool more each time with the result that the heatings of bimetal strip 27 become fewer and fewer so that it assumes the position more nearly identical with that of the room temperature. Since contact 15 is being lowered it will also require less heating of bimetal strip 18 to separate contacts 15 and 16 with the result that the quantity of heat supply to the bimetal strip 27 is decreased. In this way a throttling action of the heat control supply means is secured and in operation of the furnace is coordinated with the degree of demand.

In Figure 2 I have shown another modification in which the valve stem 13 carries an arm 41 to which is affixed a contact 42 which slides over a rheostat 43. Contact 42 and rheostat 43 are connected in series with a source of direct current and with a solenoid 44. This solenoid includes a core 46 of the floating type supported by bell crank 47. The bell crank is also connected by a link 48 to a movable contact arm 49 which moves between contacts 31 and 32 to effect the same control as is secured by the bimetal strip 27 and its contact 29.

In Figure 3 is disclosed a preferred form of control device for the motor and valve. In this form bimetal strip 27 carries a copper fin 61 extending between pole pieces 62 and 63 of core 64. A shading coil 66 is carried by pole 63 while a winding 67 is connected to a source of A. C. and resistance 43. The copper fin cooperates with the core 64 to provide a shaded pole motor, the bimetal taking up instantaneously a position corresponding to that determined by resistance 43 and contact 42. This is a very simple, inexpensive and yet rugged and responsive device operable on A. C. without hum.

I claim:

1. In combination, a valve, means for moving said valve including a slow operating motor and a member movable over a path having one extreme corresponding to a valve closed position and another extreme corresponding to a valve open position, resistance means, a contact moved by said member over said resistance means, a bimetal strip including a metal fin, said strip controlling operation of said motor, a core having opposite pole pieces, a coil and a shading coil cooperating with said fin to provide a shaded pole motor, and means connecting said coil and said resistance means to a source of current.

2. In combination, a thermostat including a bimetal strip, a metal fin carried by said strip and cooperating with a shaded pole core to provide a shaded pole motor for moving said strip.

3. In combination, a thermostat including a bimetal strip, a metal fin carried by said strip and cooperating with a shaded pole core to provide a shaded pole motor for moving said strip, a coil on said core, and means for energizing said coil selectively and to different extents.

4. In combination, a primary condition control means, means for controlling said primary means including a thermostat including a bimetal strip, a metal fin carried by said strip and cooperating with a shaded pole core to provide a shaded pole motor for moving said strip, a coil on said core, and means for energizing said coil selectively and to different extents dependent upon positioning of said primary control means.

5. In combination, a control device as a valve, said device including an element movable over a path, a resistance, a contact movable by said element over said resistance during movement of said element over said path, a motor operable in opposite directions to move said element, a bimetal strip, contacts cooperating with said strip to control operation of said motor, a field coil in a circuit with said contact and said resistance, said resistance and contact controlling the effective field strength of said coil, and a metal fin member carried by said strip and movable by the field created by said field coil for moving said strip.

WILLIAM A. RAY.